(12) United States Patent
Hatani et al.

(10) Patent No.: US 7,652,690 B2
(45) Date of Patent: Jan. 26, 2010

(54) FRONT-END SIGNAL PROCESSING CIRCUIT AND IMAGING DEVICE

(75) Inventors: Naohisa Hatani, Kyoto (JP); Mitsuhiko Otani, Hyogo (JP); Kouji Yamaguchi, Kyoto (JP)

(73) Assignee: Panasonic Corporation, Osaka (JP)

( * ) Notice: Subject to any disclaimer, the term of this patent is extended or adjusted under 35 U.S.C. 154(b) by 504 days.

(21) Appl. No.: 11/723,117

(22) Filed: Mar. 16, 2007

(65) Prior Publication Data
US 2007/0216778 A1 Sep. 20, 2007

(30) Foreign Application Priority Data
Mar. 16, 2006 (JP) .............................. 2006-072348

(51) Int. Cl.
*H04N 5/228* (2006.01)
(52) U.S. Cl. .................................................. 348/222.1
(58) Field of Classification Search ............... 348/222.1
See application file for complete search history.

(56) References Cited

U.S. PATENT DOCUMENTS

| 5,212,545 | A * | 5/1993 | Kageyama | 348/655 |
| 6,587,144 | B1 * | 7/2003 | Kim | 348/241 |
| 6,597,395 | B1 * | 7/2003 | Kim et al. | 348/222.1 |
| 6,783,073 | B2 * | 8/2004 | Yahagi et al. | 235/462.28 |
| 2002/0047934 | A1 | 4/2002 | Nitta et al. | |
| 2002/0176009 | A1 * | 11/2002 | Johnson et al. | 348/229 |
| 2004/0189843 | A1 * | 9/2004 | Holberg et al. | 348/294 |
| 2004/0263641 | A1 * | 12/2004 | Tsuda | 348/222.1 |
| 2005/0088455 | A1 * | 4/2005 | Chang | 345/603 |
| 2006/0061668 | A1 * | 3/2006 | Ise | 348/222.1 |
| 2006/0102827 | A1 * | 5/2006 | Kasuga et al. | 250/208.1 |
| 2007/0222867 | A1 * | 9/2007 | Murata et al. | 348/222.1 |

FOREIGN PATENT DOCUMENTS

JP    2001-189892    7/2001

\* cited by examiner

*Primary Examiner*—Tuan Ho
*Assistant Examiner*—Kent Wang
(74) *Attorney, Agent, or Firm*—Wenderoth, Lind & Ponack, L.L.P.

(57) ABSTRACT

A front-end signal processing circuit that stabilizes a black level of an output signal of an image sensor in a prescribed set level, without being influenced by a DC offset component of circuit elements making up a feedback loop, and an imaging device including such the front-end signal processing circuit, are provided.

The front-end signal processing circuit includes a feedback loop made up of a luminance detecting/digitizing section and a black level clamp section, and clamps a black level of an output signal of an image sensor to a prescribed set level. The front-end signal processing circuit further includes an offset correction section. The offset correction section stores an offset value being a difference between a signal level of an OB region of the image sensor and the prescribed level, subtracts the offset value from a digital luminance signal corresponding to an effective pixel region of the image sensor, and outputs the obtained signal.

7 Claims, 5 Drawing Sheets

Fig.5A OUTPUT OF IMAGE SENSOR

Fig.5B OUTPUT OF ADC

Fig.5C OUTPUT OF LPF IN OFFSET CORRECTION SECTION

Fig.5D INPUT OF DPGA

FRONT-END SIGNAL PROCESSING CIRCUIT AND IMAGING DEVICE

BACKGROUND OF THE INVENTION

1. Field of the Invention

The present invention relates to a front-end signal processing circuit that processes an analog signal outputted from an image sensor, and an imaging device including such the front-end signal processing circuit.

2. Related Art

The analog signal outputted from an image sensor such as a CCD (Charge Coupled Device) is first processed by the front-end signal processing circuit, and is outputted to a DSP (Digital Signal Processor) at the following stage. JP-A-2001-189892 discloses an imaging device having the image sensor and the front-end signal processing circuit. The image sensor has an effective pixel region in which light from an object is received and photoelectric conversion of the light is performed, and an optical black region (hereinafter referred to as an "OB region") being an optical black area in which the photoelectric conversion is not performed, and the imaging device outputs an output signal corresponding to the effective pixel region and the OB region. The front-end signal processing circuit includes a luminance detecting/digitizing section that samples the output signal of the image sensor and converts the sampled signal into a digital luminance signal, and a black level clamp section that makes up a feedback loop together with the luminance detecting/digitizing section. The black level clamp section supplies a feedback voltage to a CDS so that the digital luminance signal corresponding to the OB region is coincident with a prescribed set level, and controls the CDS so that the black level of the digital luminance signal corresponding to the effective pixel region is clamped to the prescribed set level. The clamped digital luminance signal corresponding to the effective pixel region is amplified and outputted to the DSP at the following stage. The luminance detecting/digitizing section includes circuit elements such as a correlated double sampling section (hereinafter referred to as a "CDS") and an A/D converter (hereinafter referred to as an "ADC"), and the black level clamp section includes a circuit element such as a D/A converter (hereinafter referred to as a "DAC").

If a DC offset component is not included in each circuit element such as CDS, ADC, and DAC included in the luminance detecting/digitizing section and the black level clamp section, the black level of the digital luminance signal corresponding to the effective pixel region and clamped based on the digital luminance signal corresponding to the OB region becomes equal to the set level. However, since the DC offset component is usually included in these circuit elements, an error is generated by an influence of the DC offset component, and the black level of the output signal corresponding to the effective pixel region is not equal to the set level. Therefore, there is a problem that an output corresponding to an original signal level of the effective pixel region can not be obtained. For example, when a difference between the signal level of the effective pixel region and the black level becomes small by the DC offset component, there is a problem that an image becomes darker than an original image. Particularly, when the output signal corresponding to the effective pixel region is amplified and outputted to the DSP at the following stage, the error by the DC offset component becomes large in accordance with an amplification factor. Therefore, there is a problem that an output obtained in the DSP becomes far removed from the original signal level of the effective pixel region.

SUMMARY OF THE INVENTION

The present invention is provided in order to solve the above-described problem, and an object of the present invention is to provide a front-end signal processing circuit capable of stabilizing a black level of an output signal of an image sensor in a prescribed set level, without being influenced by a DC offset component of circuit elements making up a feedback loop, and an imaging device including such the front-end signal processing circuit.

The front-end signal processing circuit of the present invention includes a luminance detecting/digitizing section that detects luminance information included in an output signal of a image sensor having an OB region and an effective pixel region, clamps the black level of the luminance information to a prescribed set level based on a feedback voltage, and converts the luminance information into a digital luminance signal; a black level clamp section that generates the feedback voltage based on the digital luminance signal corresponding to the OB region and supplies the feedback voltage to the luminance detecting/digitizing section; and an offset correction section that corrects a difference between the black level of the digital luminance signal corresponding to the effective pixel region after clamping and the prescribed set level based on the digital luminance signal corresponding to the OB region.

Figure 3:
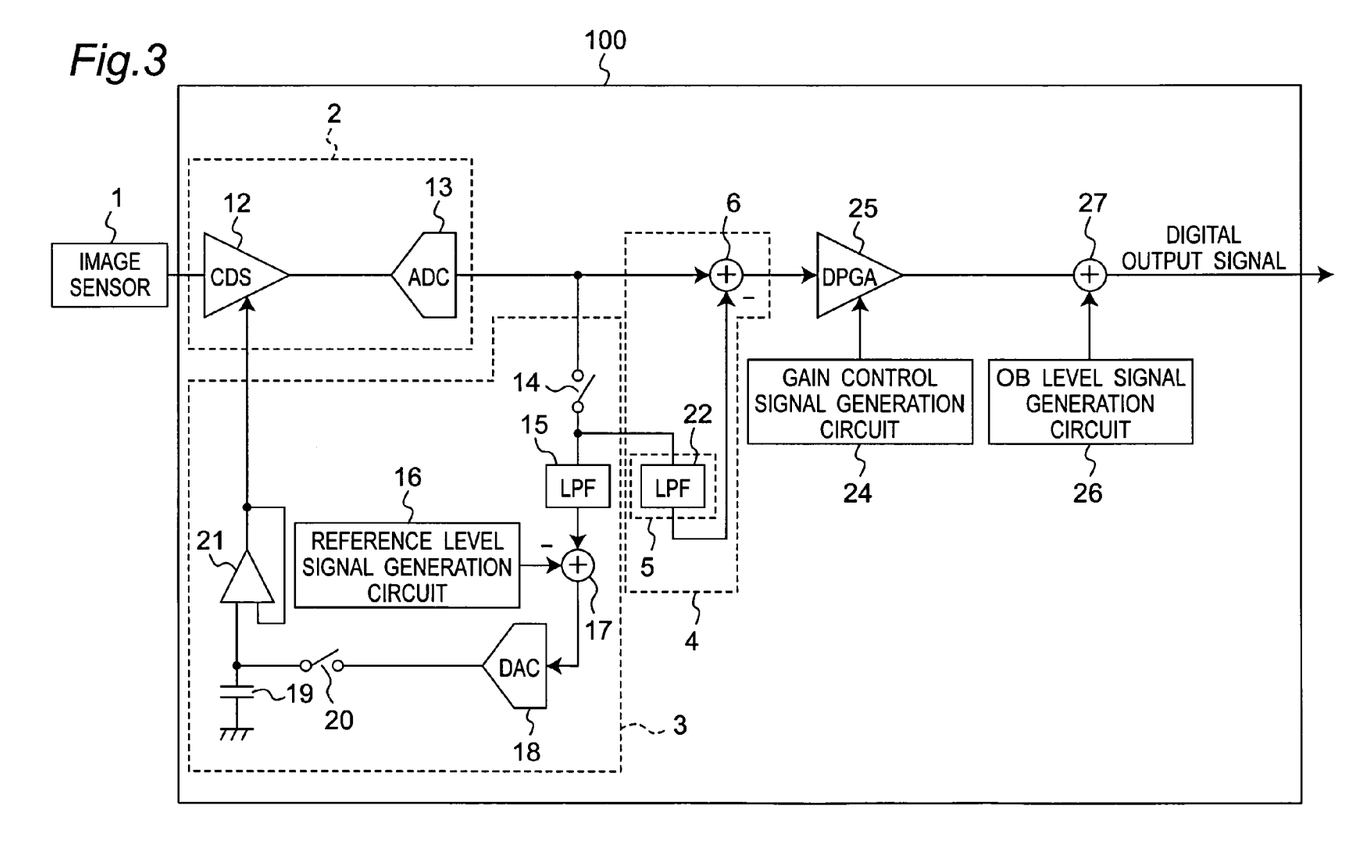
FIG. 3 is a block diagram showing an internal configuration of a front-end signal processing circuit of the embodiment of the present invention.

The "prescribed set level" corresponds to "a signal level of a reference level signal outputted by a reference level signal generation circuit 16" in a state before inputted in a subtracter 6 shown in FIG. 3, and corresponds to "zero" in an output of a subtracter 6, that is, in an input of a DPGA 25.

The offset correction section may have an offset storage section that stores, as an offset value, a difference between the signal level of the digital luminance signal corresponding to the OB region and the set level, and a subtracter that subtracts the offset value stored in the offset storage section from the digital luminance signal which is output from the luminance detecting/digitizing section and corresponds to the effective pixel region after clamping.

By calculating an average value of digital luminance signals corresponding to OB regions on a plurality of horizontal lines of the image sensor, the offset storage section may store a difference between the average value and the set level as the offset value.

The offset storage section may be a low-pass digital filter (hereinafter referred to as a "LPF").

The front-end signal processing circuit may further have a digital programmable gain amplifier (hereinafter referred to as a "DPGA") that amplifies the digital luminance signal corresponding to the effective pixel region outputted from the offset correction section, based on a gain control signal.

The front-end signal processing circuit may further have an addition section that adds a prescribed value being a reference of the black level to the digital luminance signal corresponding to the effective pixel region outputted from the offset correction section.

A imaging device of the present invention has a image sensor having an OB region and an effective pixel region, and the aforementioned front-end signal processing circuit that processes the output signal of the image sensor.

The front-end signal processing circuit and the imaging device including the front-end signal processing circuit of the present invention, correct the difference between the black level of the digital luminance signal corresponding to the effective pixel region after clamping and the prescribed set level based on the digital luminance signal corresponding to the OB region. Therefore, the black level of the output signal of the image sensor can be stabilized in the prescribed set level, without being influenced by the DC offset component of the circuit elements making up the feedback loop.

BRIEF DESCRIPTION OF THE DRAWINGS

FIGS. 4A to 4C show respective waveform charts corresponding to output signals of a plurality of horizontal lines, FIG. 4B shows the output signal of ADC, FIGS. 5A to 5D show respective waveform charts corresponding to an output signal of one horizontal line, FIG. 5B shows the output signal of ADC.

DETAILED DESCRIPTION OF THE PREFERRED EMBODIMENTS

Preferred embodiments of the present invention will be explained, with reference to the drawings hereunder.

[1.1] Configuration of an Imaging Device

Figure 1:
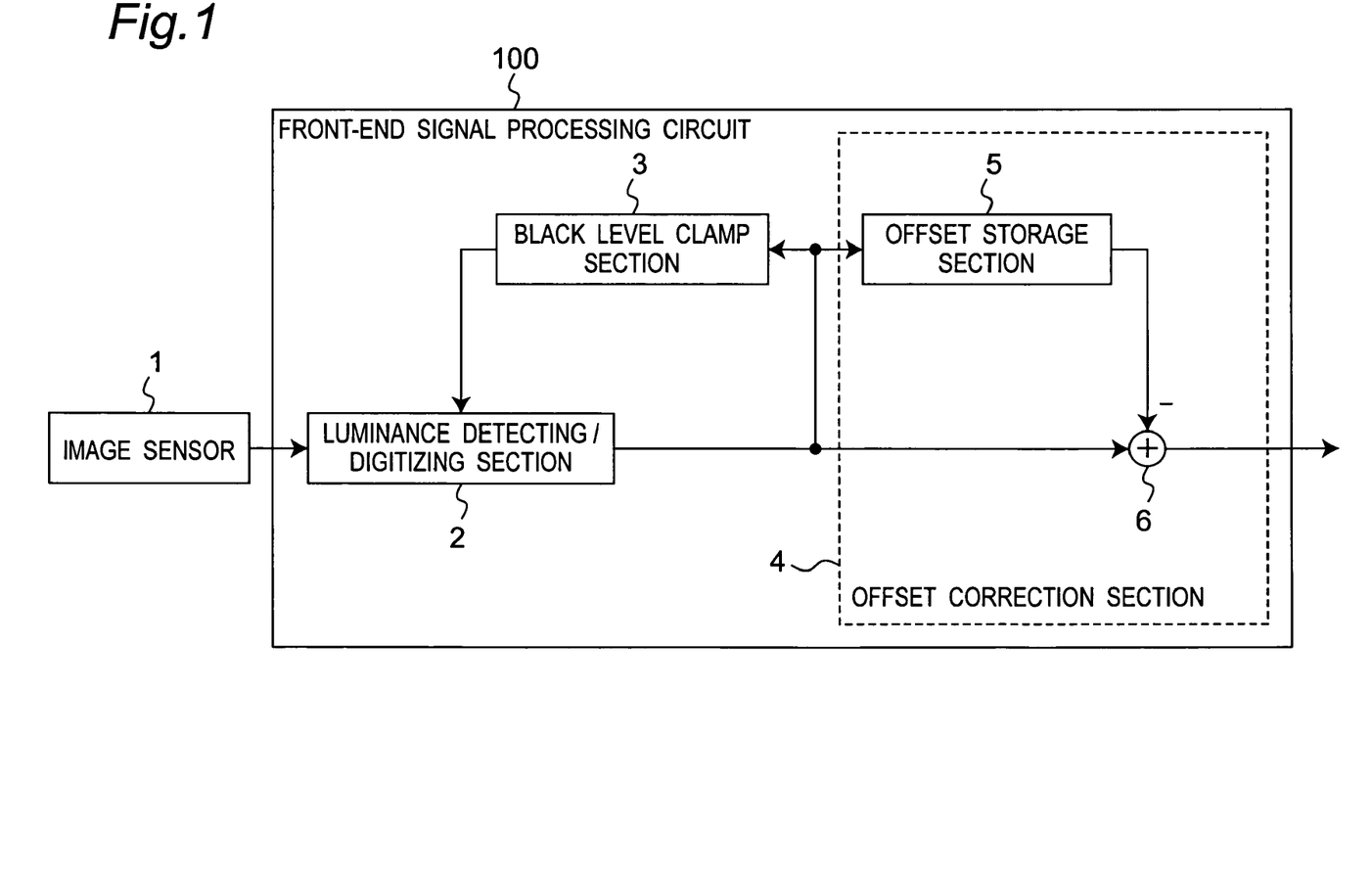
FIG. 1 is a block diagram showing a configuration of an imaging device of an embodiment of the present invention.

FIG. 1 shows a configuration of an imaging device of an embodiment of the present invention. The imaging device of the embodiment has an image sensor 1 and a front-end signal processing circuit 100 that processes an output signal of the image sensor 1. The front-end signal processing circuit 100 is made up of a semiconductor integrated circuit (IC).

The front-end signal processing circuit 100 has a luminance detecting/digitizing section 2 that detects luminance information included in the output signal of the image sensor 1 to clamp a black level of the luminance information to a prescribed set level based on a feedback voltage being a clamp level and converts the luminance information into a digital luminance signal; and a black level clamp section 3 that makes up a feedback loop together with the luminance detecting/digitizing section 2 to supply the feedback voltage to the luminance detecting/digitizing section 2 so that the black level of the digital luminance signal is clamped to a prescribed set level.

In the feedback loop made up of the luminance detecting/digitizing section 2 and the black level clamp section 3, the black level of the digital luminance signal is clamped to the prescribed set level. However, an error is generated by an influence of a DC offset component of circuit elements included in the feedback loop, and the black level of the digital luminance signal after clamping is not equal to the prescribed set level. Therefore, the front-end signal processing circuit 100 of this embodiment further has an offset correction section 4 that corrects an offset value being the error between the black level of the digital luminance signal and the prescribed set level.

The offset correction section 4 has an offset storage section 5 that stores the offset value included in the digital luminance signal outputted from the luminance detecting/digitizing section 2; and a subtracter 6 that digitally-subtracts an output signal of the offset storage section 5 from the output signal of the luminance detecting/digitizing section 2.

[1.1.1] Configuration of the Image Sensor

Figure 2:
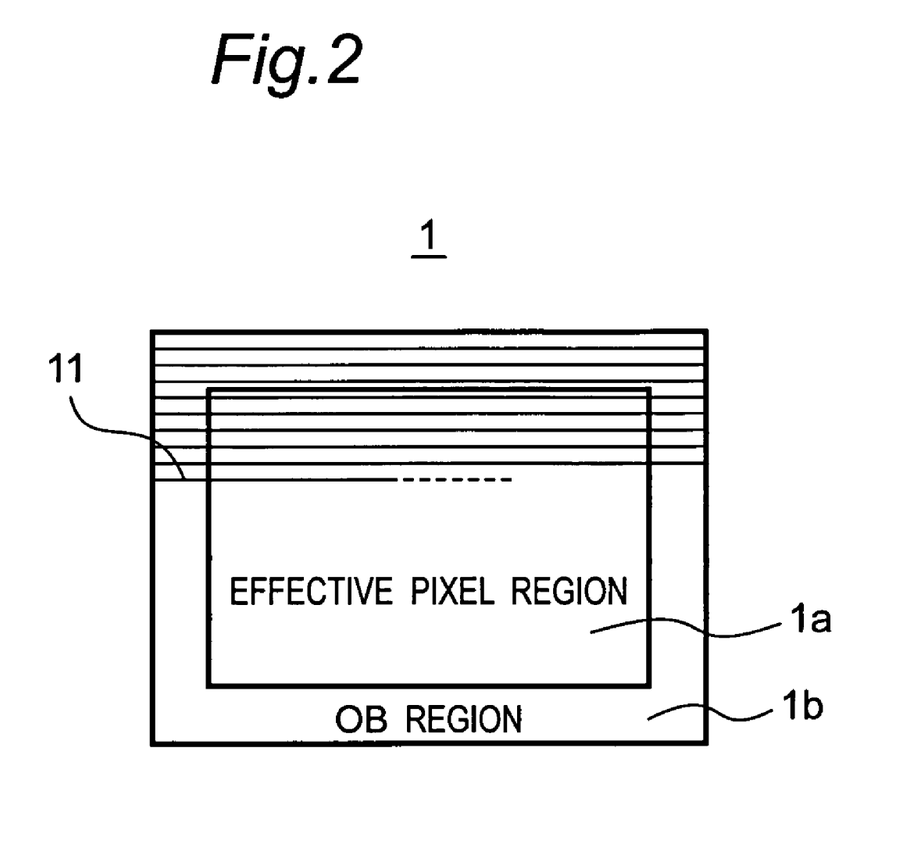
FIG. 2 is a view showing an image sensor of the embodiment of the present invention.

FIG. 2 shows the configuration of the image sensor 1. In this embodiment, the image sensor 1 is a CCD image sensor. The image sensor 1 has an effective pixel region 1a in which light from an object is received and a photoelectric conversion is performed; and an OB region 1b being an optical black area which is provided in periphery of the effective pixel region 1a and in which the photoelectric conversion is not performed. The image sensor 1 reads and outputs signals corresponding to the effective pixel region 1a and the OB region 1b every horizontal line 11. The output of the image sensor 1 includes a dark current generated by a crystal fault even in a state that light does not enter thereon. The signal of the OB region 1b is used for removing a direct current of this dark current from the signal of the effective pixel region 1a.

[1.1.2] Configuration of the Front-End Signal Processing Circuit

FIG. 3 shows an internal configuration of the front-end signal processing circuit 100. The luminance detecting/digitizing section 2 has a CDS 12 that samples luminance information from the output signal of the image sensor 1 and outputs an analog luminance signal; and an ADC 13 that converts the analog luminance signal outputted from the CDS 12 into the digital luminance signal. The CDS 12 clamps the analog luminance signal corresponding to the OB region 1b and the analog luminance signal corresponding to the effective pixel region 1a, so that the analog luminance signal corresponding to the OB region 1b and the black level of the analog luminance signal corresponding to the effective pixel region 1a is equal to the prescribed set level based on the feedback voltage supplied from the black level clamp section 3.

The black level clamp section 3 has a switch 14 connected to an output of the ADC 13. The switch 14 is turned on only when the digital luminance signal corresponding to the OB region 1b is outputted from the ADC 13, and is turned off when the digital luminance signal corresponding to the effective pixel region 1a is outputted. When the switch 14 is turned on, the digital luminance signal corresponding to the OB region 1b is inputted in a subtracter 17 through an LPF 15. The LPF 15 outputs the digital luminance signal of a low frequency. A reference level signal generation circuit 16 outputs a reference level signal being a reference of the black level. The subtracter 17 subtracts the reference level signal from the output of the LPF 15 and outputs the obtained signal.

The output signal of the subtracter 17 is inputted in a DAC 18, and is converted into analog from digital. An output side of the DAC 18 is connected to one end of the switch 20. A capacitor 19 is connected between a ground potential and an input of a buffer 21, and anther end of the switch 20 is connected between the capacitor 19 and the input of the buffer 21. The switch 20 is turned on for a prescribed period. The switch 20 is turned on, so that the feedback voltage based on an output value of the DAC 18 is stored in the capacitor 19 as a clamp level. The feedback voltage outputted from the buffer 21 is supplied to the CDS 12 in the luminance detecting/digitizing section 2. In this way, by supplying the feedback voltage to the CDS 12, the black level clamp section 3 controls the CDS 12 so that the black level of the analog luminance signal is clamped to the prescribed set level. The "prescribed set level" mentioned here corresponds to the signal level of the reference level signal outputted from the reference level signal generation circuit 16.

The offset storage section 5 in the offset correction section 4 is made up of an LPF 22. In this embodiment, the LPF 22 is a filter of a lower region than the LPF 15 of the black level clamp section 3. The LPF 22 is connected to the switch 14 which is turned on only when the digital luminance signal corresponding to the OB region 1*b* is outputted, and the digital luminance signal corresponding to the OB region 1*b* is inputted to the LPF 22 from the ADC 13. The LPF 22 has a function of storing the signal level of the digital luminance signal. The digital luminance signal outputted from the ADC 13 includes an offset being the error between the black level of the digital luminance signal, generated by the DC offset component of the circuit elements such as the CDS 12, ADC 13, and DAC 18 included in the feedback loop, and the prescribed set level. By storing the digital luminance signal outputted from the ADC 13, the LPF 22 stores this offset value. In this embodiment, the LPF 22 calculates an average value of the signal level of the inputted digital luminance signal corresponding to the OB region 1*b*, and stores the average value thus obtained. The output of the LPF 22 is connected to a subtracter 6. The subtracter 6 subtracts the average value of the signal level of the digital luminance signal stored in the LPF 22, from the digital luminance signal outputted from the ADC 13, and outputs the signal thus obtained.

The front-end signal processing circuit 100 further has a gain control signal generation circuit 24 that outputs a prescribed gain control signal; and a DPGA 25 that amplifies and outputs the output of the subtracter 6 based on the gain control signal.

In addition, the front-end signal processing circuit 100 further has an OB level signal generation circuit 26 that output an OB level signal being the reference of the black level; and an adder 27 that adds the OB level signal to the output of the DPGA 25 and outputs the signal thus obtained. The output of the adder 27 is the output of the front-end signal processing circuit 100, and is outputted to the DSP at the following stage.

[1.2] Operation of the Imaging Device

Figure 4A:
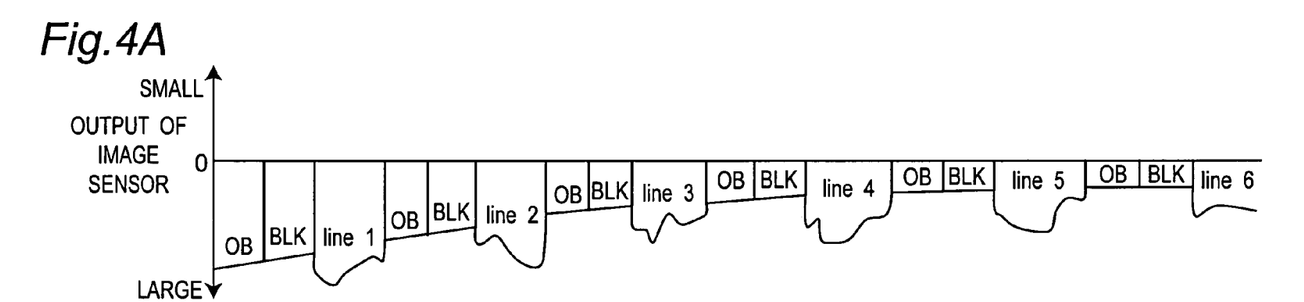
FIG. 4A shows the output signal of the image sensor.
Figure 4B:
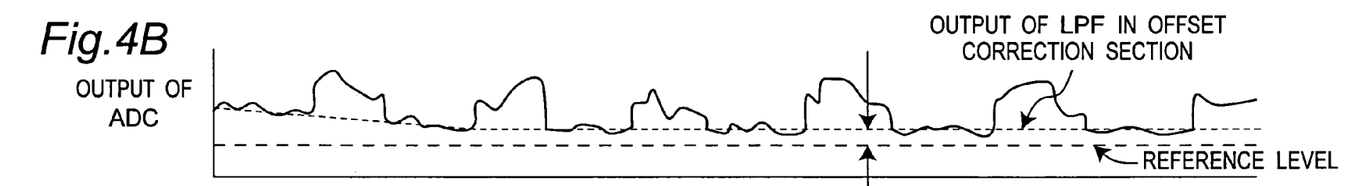
Figure 4C:
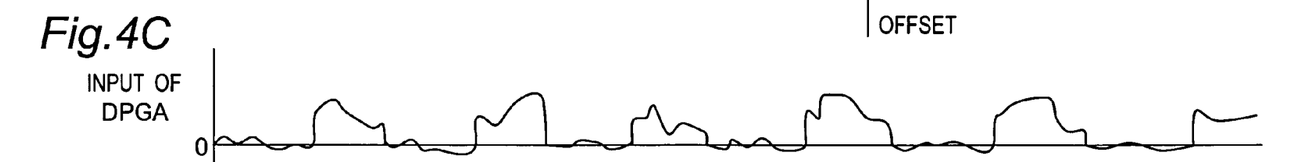
FIG. 4C shows an input signal of DPGA.

FIGS. 4A to 4C are respective waveform charts corresponding to the output signals of a plurality of horizontal lines, and FIG. 4A shows the output signal of the image sensor 1, FIG. 4B shows the output signal of the ADC 13, and FIG. 4C shows the input signal of the DPGA 25, respectively.

As shown in FIG. 4A, the output signal of the image sensor 1 includes a signal OB corresponding to the OB region 1*b*, a signal BLK corresponding to a blanking period, and a signal (line 1, etc.) corresponding to the effective pixel region 1*a*. As shown in FIG. 4B, the signal outputted from the ADC 13 includes the offset caused by the DC offset component of the circuit elements included in the luminance detecting/digitizing section 2 and the black level clamp section 3 which makes up the feedback loop. However, the front-end signal processing circuit 100 of this embodiment has the offset correction section 4 for correcting the offset, between the ADC 13 and the DPGA 25. Therefore, this offset is not included in the input signal of the DPGA 25 as shown in FIG. 4C.

An operation of the front-end signal processing circuit 100 of this embodiment will be specifically explained, by using FIG. 5. FIGS. 5A to 5D show respective waveform charts corresponding to the output signal of one horizontal line including an effective signal of line 1 of FIG. 4A, and FIG. 5A shows the output signal of the image sensor 1, FIG. 5B shows the output signal of the ADC 13, FIG. 5C shows the output signal of the LPF 22 of the offset correction section 4, and FIG. 5D shows the input signal of the DPGA 25, respectively.

[1.2.1] Operation of OB Period

The OB period refers to a period for inputting the signal corresponding to the OB region 1*b* of the image sensor 1, and the front-end signal processing circuit 100 charges the feedback voltage being the clamp level in the capacitor 19 in this period, and stores the offset included in the signal of the OB region 1*b* after clamping in the LPF 22.

While the signal corresponding to the OB region 1*b* is outputted from the image sensor 1, the switch 14 of the black level clamp section 3 is turned on. The signal of the OB region 1*b* outputted from the image sensor 1 enters the feedback loop which is made up of the luminance detecting/digitizing section 2 and the black level clamp section 3. By turning on the switch 20 for a prescribed period, the black level clamp section 3 charges, in the capacitor 19 as the clamp level, the feedback voltage based on the difference between the signal level of the OB region 1*b* and the signal level of the reference level signal outputted from the reference level signal generation circuit 16. The feedback voltage charged in the capacitor 19 is supplied to the CDS 12. Thus, the signal of the OB region 1*b* is clamped to the signal level of the reference level signal. However, by the influence of the DC offset component of the circuit elements included in the feedback loop, the signal of the OB region 1*b* after clamping includes the offset and is not coincident with the signal level of the reference level signal.

Meanwhile, the digital luminance signal of the OB region 1*b* outputted from the ADC 13 is inputted and stored in the LPF 22 of the offset correction section 4, through the switch 14 in on-state. The offset is also included in the signal of the OB region 1*b* stored in the LPF 22.

[1.2.2] Operation in Blanking Period

The blanking period refers to a period provided between the OB period and an effective pixel period, and according to this embodiment, in this period, the output of the LPF 22 is switched to the signal stored in the OB period.

Figure 5A:
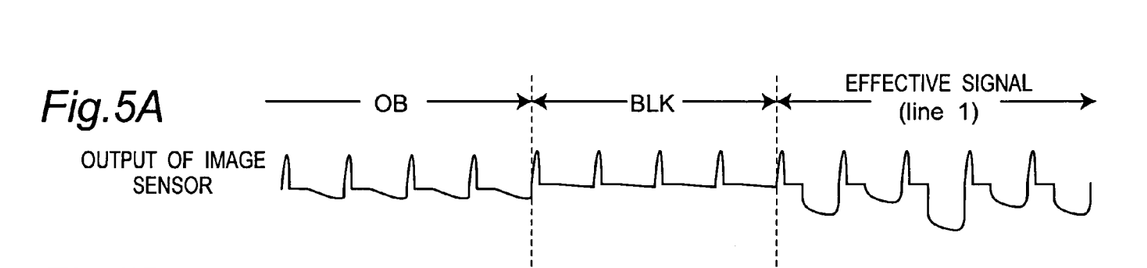
FIG. 5A shows the output signal of the image sensor.
Figure 5B:
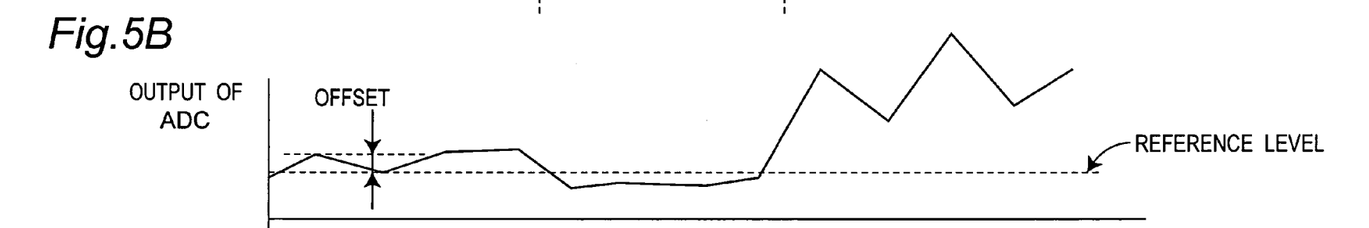
Figure 5C:
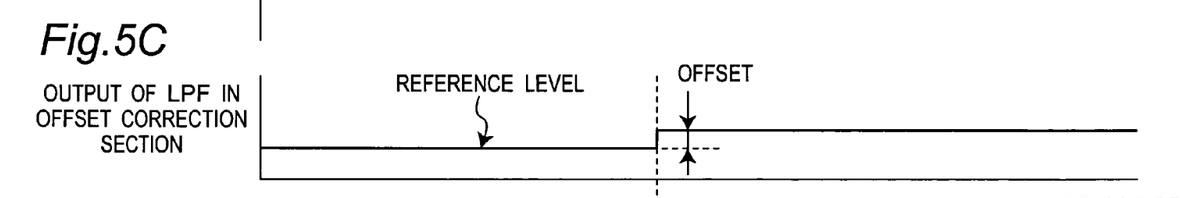
FIG. 5C shows the output signal of LPF of an offset correction section.

When the signal corresponding to the blanking period is outputted from the image sensor 1, the switch 14 of the black level clamp section 3 is turned off. The LPF 22 calculates and stores the average value of the signal of the OB region 1*b* inputted in the OB period, and outputs the average value thus obtained at a prescribed timing in the blanking period. The output signal of the LPF 22 has a level obtained by adding the offset value to the reference level signal (FIG. 5C).

[1.2.3] Operation of an Effective Pixel Period

The effective pixel period refers to a period for inputting the signal corresponding to the effective pixel region 1*a* of the image sensor 1, and the front-end signal processing circuit 100 clamps the signal of the effective pixel region 1*a* based on the feedback voltage stored in the OB period, and corrects the offset included in the signal of the effective pixel region 1*a* based on the output of the LFP 22.

While the signal corresponding to the effective pixel region 1*a* is outputted from the image sensor 1, the switch 14 of the black level clamp section 3 is turned off. The CDS 12 samples and outputs the signal of the effective pixel region 1*a* outputted from the image sensor 1. At this time, the feedback voltage charged by the black level clamp section 3 in the capacitor 19 in the OB period is supplied to the CDS 12, and the black level of the signal of the effective pixel region 1*a* is clamped to the signal level of the reference level signal. However, actually, by the influence of the DC offset component of the circuit elements included in the feedback loop, the offset is included in the black level of the signal of the effective pixel region 1*a* after clamping, and this black level is not coincident with the signal level of the reference level signal. Therefore, the digital luminance signal outputted from the ADC 13 is in a state of including the offset. The output of the ADC 13 is outputted to the subtracter 6.

Since the switch 14 is turned off, the digital luminance signal of the effective pixel region 1a is not outputted to the black level clamp section 3 and the LPF 22. The LPF 22 outputs the signal including the offset, after the LPF 22 switches the output at a prescribed timing in the blanking period.

Figure 5D:
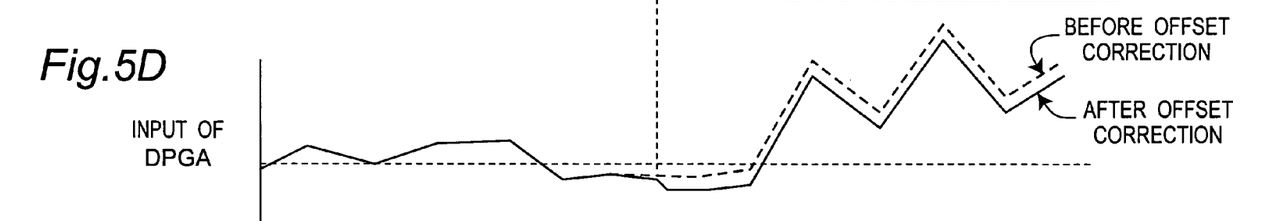
FIG. 5D shows the input signal of DPGA.

The subtracter 6 subtracts the output signal of the LPF 22 from the digital luminance signal corresponding to the effective pixel region 1a outputted from the ADC 13, and inputs this signal in the DPGA 25. The offset is included in both of the signal of the effective pixel region 1a inputted in the subtracter 6 and the signal stored in the LPF 22. Therefore, the output of the subtracter 6 is a value obtained by removing the offset from the signal of the effective pixel region 1a, and is smaller by this removed portion of the offset component, as compared with a case before correcting the offset (FIG. 5D). Since the reference level signal is included in the signal stored in the LPF 22, the signal inputted in the DPGA 25 has a value obtained by subtracting the reference level signal and the offset portion, and the black level of the signal inputted in the DPGA 25 is equal to zero. The signal, from which the offset is removed, is amplified by the DPGA 25 based on the gain control signal, and an OB level signal is added to the amplified signal by an adder 27, and the signal thus obtained is outputted as the output signal of the front-end processing circuit 100. In this way, the black level of the signal outputted from the front-end processing circuit 100 is equal to the signal level of the OB level signal.

The front-end signal processing circuit 100 of this embodiment has the LPF 22 to store, in the LPF 22, the signal including the offset being the error between the signal of the OB region 1b and the prescribed set level and caused by the DC offset component of the circuit elements included in the feedback loop. Therefore, when the signal of the effective pixel region 1a is inputted in the front-end signal processing circuit 100, the offset included in the signal of the effective pixel region 1a can be removed by subtracting the signal stored in the LPF 22 from the signal of the effective pixel region 1a. Therefore, the black level of the signal of the effective pixel region 1a when inputted in the DPGA 25 can be made equal to zero, and a stable black level can thereby be obtained.

If the offset component is made not to be included by increasing an accuracy of a circuit for processing the analog signal, a circuit scale is increased and a cost of a front-end signal processing circuit is also increased. However, according to this embodiment, the black level at the time of inputting to the DPGA can be stabilized in zero without increasing the circuit scale, by just providing the LPF 22 as the offset storage section 5. Therefore, the cost of the front-end signal processing circuit 100 can be reduced. In addition, a fabrication yield is improved, because the influence by the DC offset component can be suppressed.

[1.3] Modified Examples

In this embodiment, the LPF 22 calculates the average value of the digital luminance signal of the OB region 1b of one horizontal line of the image sensor 1 and stores the average value. However, the LPF 22 may calculate the average value of the digital luminance signal of the OB region 1b of a plurality of horizontal lines and store the average value. Thus, the black level can be stabilized in zero by a simple circuit.

Also, in this embodiment, the image sensor 1 is a CCD image sensor. However, the image sensor 1 may be other image sensor, for example, a CMOS image sensor.

In addition, a programmable gain amplifier (PGA) may be provided between the CDS 12 and the ADC 13 of the luminance detecting/digitizing section 2.

Further, in this embodiment, the LPF 15 and the LPF 22 are separately provided. However, it may be so made up that one LPF executes an operation in the black level clamp section 3 and an operation as the offset storage section 5.

In addition, the internal configuration of the black level clamp section 3 is not limited to this embodiment. It may be so made up that, in the feedback loop, the black level of the digital luminance signal can be clamped to a constant reference level by using the signal of the OB region 1b.

The front-end signal processing circuit of the present invention has an advantage that the black level of the output signal of the image sensor can be stabilized in the prescribed set level, without being influenced by the DC offset component of the circuit elements making up the feedback loop, and is useful in the imaging device such as a digital camera and a video camera.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2006-072348, filed on Mar. 16, 2006, which is expressly incorporated herein by reference in its entirety.

What is claimed is:

1. A front-end signal processing circuit, comprising:
   a luminance detecting/digitizing section that detects luminance information included in an output signal of an image sensor having an optical black region and an effective pixel region, clamps a black level of the luminance information to a prescribed set level based on a feedback voltage, and converts the luminance information into a digital luminance signal;
   a black level clamp section that generates the feedback voltage based on a digital luminance signal corresponding to the optical black region and supplies the feedback voltage to the luminance detecting/digitizing section; and
   an offset correction section that corrects a difference between a black level of the digital luminance signal corresponding to the effective pixel region after clamping and the prescribed set level, based on the digital luminance signal corresponding to the optical black region.

2. The front-end signal processing circuit according to claim 1, wherein the offset correction section comprises:
   an offset storage section that stores the difference between a signal level of the digital luminance signal corresponding to the optical black region and the set level as an offset value; and
   a subtracter that subtracts the offset value stored in the offset storage section, from the clamped digital luminance signal which is output from the luminance detecting/digitizing section and corresponds to the effective pixel region.

3. The front-end signal processing circuit according to claim 2,
   wherein the offset storage section calculates an average value of the digital luminance signal corresponding to the optical black region on a plurality of horizontal lines of the image sensor, and stores a difference between the average value thus obtained and the set level as the offset value.

4. The front-end signal processing circuit according to claim 2, wherein the offset storage section is a low-pass digital filter.

5. The front-end signal processing circuit according to claim 1, further comprising:
   a digital programmable gain amplifier that amplifies the digital luminance signal which is output from the offset correction section and corresponds to the effective pixel region based on a gain control signal.

6. The front-end signal processing circuit according to claim 1, further comprising:
   an addition section that adds a prescribed value being a reference of the black level to the digital luminance signal corresponding to the effective pixel region and outputted from the offset correction section.

7. An imaging device, comprising:
   an image sensor having an optical black region and an effective pixel region; and
   the front-end signal processing circuit according to claim 1, that processes an output signal of the image sensor.

* * * * *